United States Patent [19]
James

[11] 3,923,328
[45] Dec. 2, 1975

[54] FIXING ARRANGEMENTS
[75] Inventor: Michael Joseph James, Charlton Kings, England
[73] Assignee: Micro & Precision Mouldings (Cheltenham) Limited, Cheltenham, England
[22] Filed: Feb. 6, 1974
[21] Appl. No.: 440,123

[52] U.S. Cl. .................. 292/75; 292/76; 248/300
[51] Int. Cl.² .................................... E05C 19/02
[58] Field of Search ............. 292/9, 15, 16, 23, 73, 292/74–79, 150, 156, 251.5; 248/73, 223, 224, 300

[56] References Cited
UNITED STATES PATENTS

| 3,151,900 | 10/1964 | Ahlgren | 292/75 |
| 3,211,317 | 10/1965 | Patriquin | 292/76 |
| 3,309,053 | 4/1967 | Baker | 248/300 |
| 3,570,125 | 3/1971 | Hahn | 248/224 |

Primary Examiner—Paul R. Gilliam
Assistant Examiner—Victor N. Sakran
Attorney, Agent, or Firm—Young & Thompson

[57] ABSTRACT

In the mass production of furniture, it is desirable initially to insert the fixing screws of components such as catches loosely, thereby to allow positional adjustment and tightening of the screws at the final assembly stage. A component accordingly has two elongate fixing screw slots which are parallel over portions allowing positional adjustment but which have mutually convergent end portions.

2 Claims, 6 Drawing Figures

FIXING ARRANGEMENTS

FIELD OF THE INVENTION

This invention relates to fixing arrangements, and in particular to the arrangement of fixing screw slots of a component which requires selective positional adjustment on fixing.

BACKGROUND OF THE INVENTION

One example of a component which commonly employs fixing screw slots to allow such adjustment on fixing is a cupboard door catch, a similar form of adjustment commonly being employed for the associated fixed keeper. In the mass production of furniture it is desirable initially to insert the fixing screws of cupboard catches and the like loosely, thereby to allow final positional adjustment and tightening of the screws at the final assembly stage. It is also convenient for the screws to be inserted first and the catches fitted on the screws subsequently, and to this end keyhole fixing slots have been employed which are enlarged at one end to provide clearance for the screw heads. However, this arrangement has the disadvantage that it is possible for the catches to fall off the screws during movement between the catch fitting and final assembly stations of the assembly line.

An object of the invention is to provide a component with fixing slots which are so disposed as to enable the component to be fitted on pre-inserted screws without the foregoing disadvantages.

SUMMARY OF THE INVENTION

According to the invention a component has two elongate fixing screw slots which are parallel over portions allowing positional adjustment before the fixing screws are fully tightened, the slots having mutually convergent end portions which allow the component to be fitted on the screws one at a time with appropriate angling of the component about the first screw to allow entry of the second screw into the corresponding slot.

In a preferred embodiment the slots are open-ended at their mutually convergent ends to allow entry of the fixing screw shanks. This allows the slots to be of constant width throughout their full length and, in one such embodiment in the form of a cupboard door catch, the open ends of the slots terminate at an upstanding rigidifying flange from which a catch member projects and which is disposed along the edge of a fixing flange in which the slots are formed. The rigidifying flange has apertures adjoining the open ends of the fixing slots and which provide clearance for the heads of the screws.

Alternatively, the fixing slots may be closed-ended, with the mutually convergent ends of the slots provided by offset enlarged portions through which the screw heads can pass. Thus the mutual convergence is in effect provided by enlargement of the corresponding ends of the slots at facing sides thereof, and the general centre lines of the slots may then converge over the corresponding end portions. In one such arrangement the convergent ends of the slots are provided by circular end portions having a diameter to suit the screw heads and greater than the normal slot width, the circular end portions being disposed tangentially of the outer edges of the slots, i.e., the increased width is then disposed entirely at the inner adjacent side edges of the slots.

DESCRIPTION OF THE PREFERRED EMBODIMENTS

Figure 1:
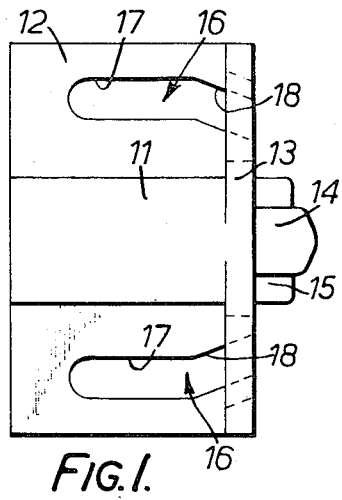
FIG. 1 is a plan view of a cupboard door roller catch.
Figure 2:
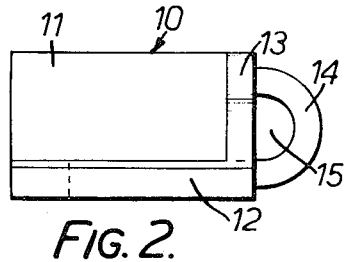
FIG. 2 is a side view of the roller catch.
Figure 3:
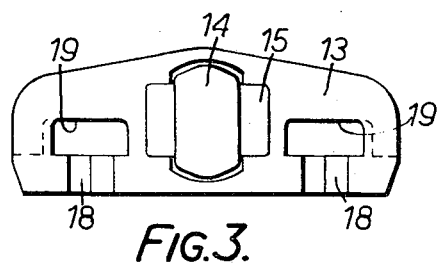
FIG. 3 is a front view of the roller catch.

The catch shown in FIGS. 1 to 3 has a moulded plastics body 10 with a central tubular housing portion 11 moulded on an integral base fixing flange 12 and with a front rigidifying flange 13 along the front edge of the fixing flange 12. A spring-loaded plunger 15 mounted in the housing is movable along an axis at right angles to the front flange 13, and at its forward end carries the catch roller 14 which projects from the front flange 13 for engagement with a corresponding fixed keeper (not shown).

On either side of the housing portion 11 the base flange 12 is formed with two screw fixing slots 16 which, over main portions 17 extending over most of their length, are parallel to each other and to the plunger axis to allow the required degree of positional adjustment on the fixing screws (not shown). At their front ends, the slots 16 have straight-sided end portions 18 which are open at the front edge of the base flange 12, these end portions 18 being mutually convergent and if projected have an included angle of about 40°, i.e., the longitudinal axis of each end portion 18 is inclined at about 20° to the longitudinal axis of the main portion 17 of the slot 16. Immediately above the open end of each slot 16, the front flange 13 is formed with a generally rectangular aperture 19 which provides a clearance for the corresponding screw head (not shown) as the slot 16 is fitted on the shank of that screw.

On fitting the catch, the two screws, which are spaced apart to correspond to the spacing of the parallel main slot portions 17, are first screwed into the door to a depth which allows loose fitting of the catch. This fitting is achieved by passing one slot 16 over the corresponding screw shank to bring the latter into the main slot portion 17, whereupon by appropriate angling the other slot 16 can receive the shank of the other screw. With both screws in the parallel main slot portions 17, the catch is loosely held to the door, ready for final adjustment before the screws are tightened, and there is substantially no danger of the catch meanwhile falling off the screws.

Figure 4:
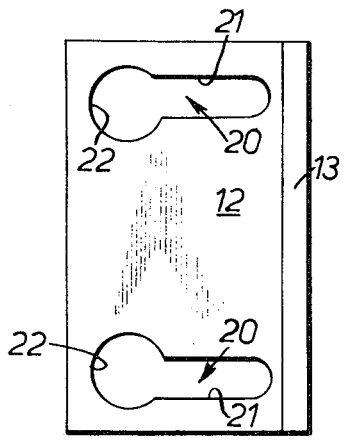
FIGS. 4, 5 and 6 illustrate modified fixing screw slot arrangements.

In the modified slot arrangement shown in FIG. 4 the slots in the flange 12 are closed-ended with the parallel main portions 21 similarly arranged. However, in this case it is the rear ends 22 of the slots 20 which are mutually convergent, such convergence being the result of an increased slot width over the convergent portions. Such end portions are circular with a diameter large enough to accept the screw head. Fixing is achieved in a generally similar manner to that described above, one slot 20 being fitted over the corresponding screw head and, with the screw in the straight main portion 21 of the slot, the catch is angled to allow the rear end portion 22 of the other slot to be fitted over the second screw head.

Figure 5:
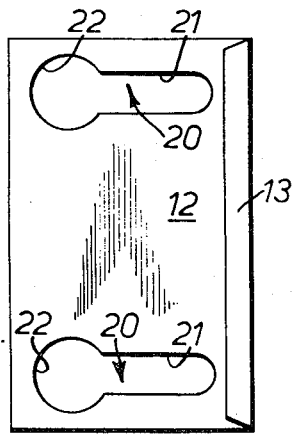
Figure 6:
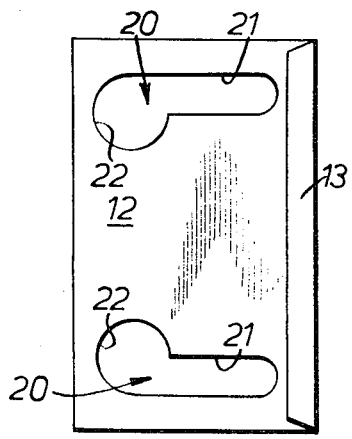

In the arrangement shown in FIG. 4, the centre of the circle defining each convergent end portion 22 is offset from the longitudinal axis of the main portion 21 of the slot whereas, in the further modification shown in FIG. 5, the centre of the circle defining the end portion 22 lies on said axis. In the modification shown in FIG. 6, the circles defining the end portions 22 are tangential to the outer side edges of the straight main slot portions 21.

What is claimed is:

1. A component having a fixing plate element with two elongate fixing screw slots which are parallel over portions of their length to allow positional adjustment of the component before, in use, pre-fixed screws received in said slots are fully tightened, the slots being parallel-sided and having open-ended mutually convergent end portions which allow the component to be fitted on the screws one at a time with appropriate angling of the component about the first screw to allow entry of the second screw into the corresponding slot.

2. A component according to claim 1, including an upstanding rigidifying flange on the fixing plate element, the open ends of the slots terminating at said flange and said flange having apertures adjoining the open ends of the slots, which apertures provide clearance for the heads of the screws.

* * * * *